United States Patent [19]

Aspenwall

[11] 3,859,767
[45] Jan. 14, 1975

[54] CORNER STRUCTURE IMPROVEMENT AND METHOD

[75] Inventor: John E. Aspenwall, Provo, Utah

[73] Assignee: Jahabow of Utah, Inc., Provo, Utah

[22] Filed: Oct. 31, 1973

[21] Appl. No.: 411,449

[52] U.S. Cl.............. 52/280, 29/495, 52/753 D, 312/257 SK, 403/270
[51] Int. Cl............................................. F16b 5/00
[58] Field of Search.. 52/585, 753 D, 753 E, 758 H, 52/758 B, 280; 135/3 R; 403/270–272; 312/257 SK; 156/296; 29/493, 484, DIG. 4; 220/80, 84

[56] References Cited
UNITED STATES PATENTS

| | | | |
|---|---|---|---|
| 2,299,143 | 10/1942 | Hellwig | 52/758 B |
| 2,806,755 | 9/1957 | Glass | 312/257 SK |
| 3,070,851 | 1/1963 | Stephens | 52/484 X |
| 3,545,123 | 12/1970 | Muller | 52/758 H X |
| 3,633,790 | 1/1972 | Voss | 220/84 X |
| 3,716,259 | 2/1973 | Weill et al. | 52/758 H |

Primary Examiner—Ernest R. Purser
Assistant Examiner—Carl D. Friedman

[57] ABSTRACT

An improvement in three-dimensional corner constructions wherein a three-member or three-legged corner spline is used to reinforce the abutment and proximate positioning of three elongate members forming edges meeting at a common corner. Specifically, a three-legged spline is employed and is designed to have proximate squared edges, with these edges being joined together by specialized welding techniques such that the weld area does not extend essentially past the surface projections of the splined members or legs employed. The reinforcing splined structure, hence, is suitable for very rapid manufacture, particularly so since grinding or filing weld areas is not required.

5 Claims, 4 Drawing Figures

PATENTED JAN 14 1975 3,859,767

CORNER STRUCTURE IMPROVEMENT AND METHOD

The present invention relates to corner constructions and, more particularly, to a new and improved corner construction incorporating a three-dimensional spline structure reinforcing means, the same being fabricated in a manner to accommodate mass-production techniques and requirements.

In connection with the construction of retail store display cases, for example, it is well known that elongate edge members meeting in a common corner are required for the purpose of supporting and fitting glass or plastic panels revealing the interior of such cases.

In the present invention the elongate edge members, though of varying lengths, may be conveniently formed from single extruded stock such as aluminum extrusions. In the present invention each of the extrusion members includes a central bore or aperture dimensioned to receive a respective leg of a three-dimensional spline or reinforcing means. The spline is so designed, in conjunction with the beveled edges of the several elongate members, that the spline can conveniently reinforce the corner formed by these members without being revealed to the common view. Self-tapping screws or other equipment means are employed to fasten the edge members of the individual splined legs so that the corner is retained. The cross-section of the extrusions is preferably the same for each member; these include not only the elongate bore for the spline but also suitable shoulder areas and grooves for glass panel installations, holes for accommodating screw implacement, and so forth.

In the invention specialized welding is employed so that the individual spline legs can be simply sheared off in transverse 90° planes, thereby enabling a rapid production of the individual spline members using mass production processes. The individual members are then inserted in a preheated jig such that the squared ends can be easily secured together as by MIG welding. This is performed such that the weld area does not extend beyond the outer surface peripheries of the individual spline members. Thus, in the invention no grinding or hand filing is needed.

Accordingly, a principal object is to provide a new and improved structure serving as a corner structure for three-dimensional objects.

A further object is to provide a three-legged reinforcing spline for corner structures.

An additional object is to provide a spline structure of such a nature that no filing or grinding is needed for spline insertion into the edge members employed in forming the corner.

A further object is to provide spline elements having squared ends, and means and a method for fabricating such spline elements and their combination structure, and this in a manner such that the spline structure so formed is in an immediate condition for use to reinforce a corner.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
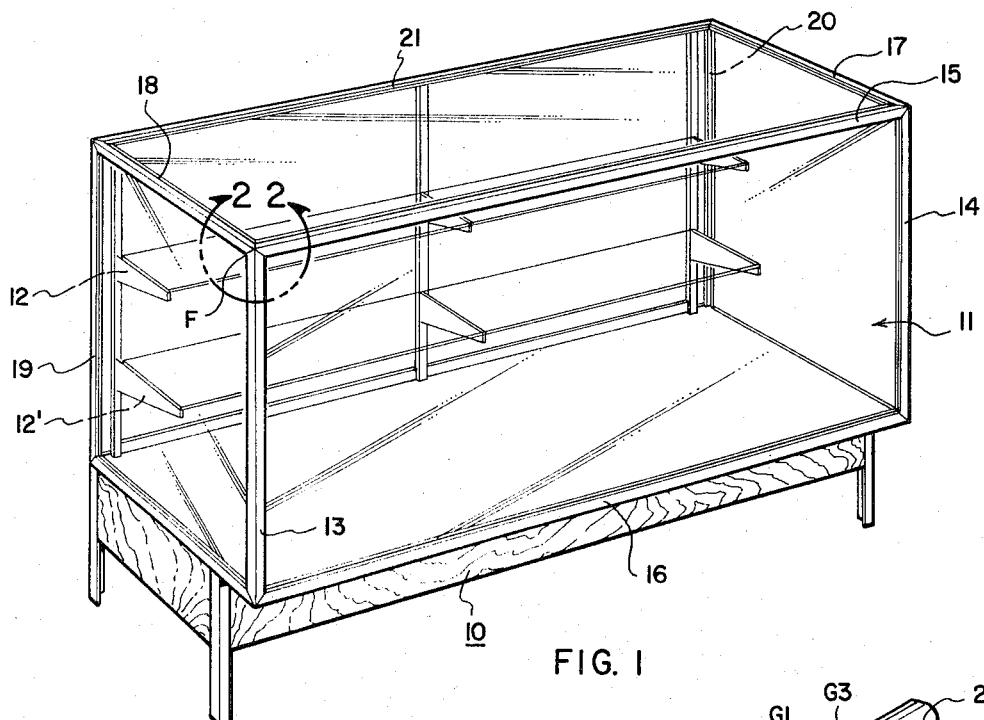
FIG. 1 is a perspective view of a display case incorporating at its corners the present invention in a preferred embodiment thereof.

In FIG. 1 a conventional base 10 supports a glass display case 11. The latter will include the usual structure supporting the usually-included shelves 12 and 12' which form no part of this invention.

Figure 2:
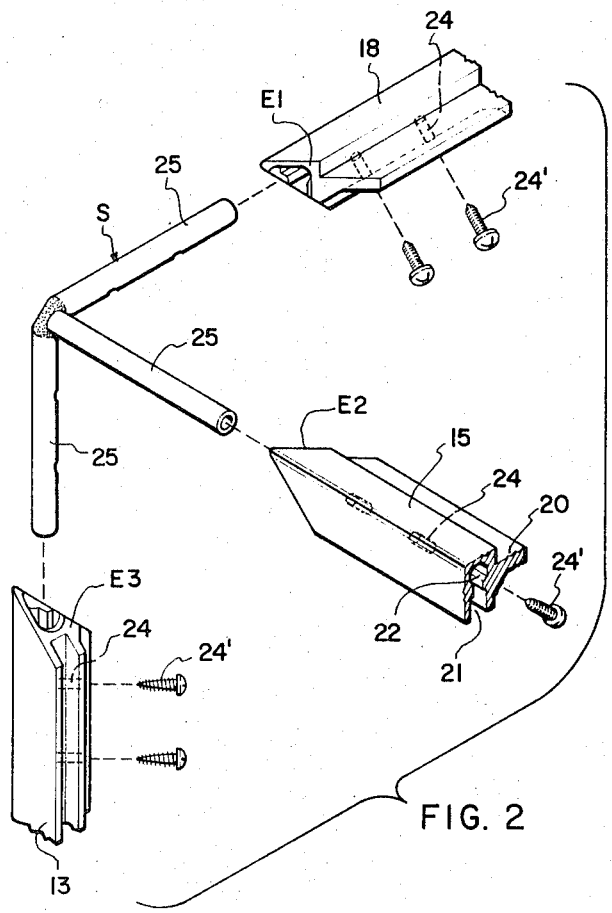
FIG. 2 is an exploded view of a representative display case corner, as taken along the arcuate line 2—2 in FIG. 1, for example, and, for convenience of demonstration, is rotationally displaced about its vertical axis, in a clockwise direction looking down, approximately 90°.

Of importance is the fact of inclusion of a series of elongate edge members 13–21, and so forth, all of which comprise varying lengths of pairs of extrusions cut preferably from stock designed with apertured cross-sections, for example see FIG. 2. The ends E1, E2, and E3 as shown in FIG. 2 are mitered in a conventional way to provide a three-legged, mitered joint, the individual members as at 13, 15 and 18 being joined in a right-angle three-axis joint such as employed in three-dimensional coordinate systems. It should be emphasized at this point that while a right-angle relationship exists among the several members and has a 13, 15, and 18 in FIG. 1, such need not necessarily be the case, since the invention is suitable for both three-dimensional acute and also obtuse corner angles.

In practice it is contemplated to fabricate the individual edge members from selected aluminum extrusion stock, the same including a recessed, shelf-shoulder 20 for receiving a horizontal pane window glass, a recessed slot 21 receiving a side, glass panel, and with the latter being contiguous and continuous with an elongate aperture or bore 22 receiving a respective spline member or leg 23.

Figure 3:
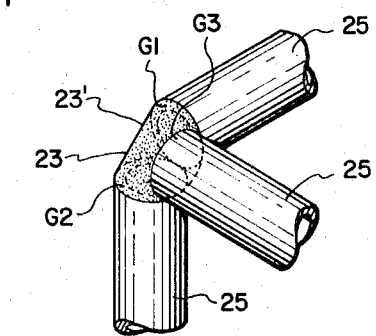
FIG. 3 is an enlarged fragmentary detail of the three-legged spline construction used in the invention and shown in FIG. 2.
Figure 4:
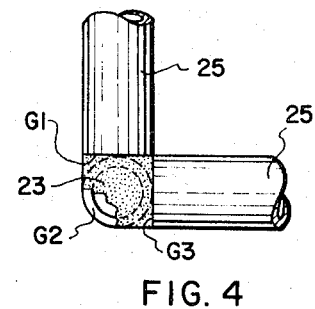
FIG. 4 is a top plan of the spline structure in FIG. 3, illustrating that the weld portion securing the spline structure together does not extend past a respective projection of the outer peripheries of respective legs of the spline structure.

As shown in FIG. 3, a plurality of splines are joined together in right-angle relationship, relative to the specific corner seen in FIG. 1 at 2—2, and are joined together by weld portion 23. It must be noted that this weld portion is applied as hereinafter explained, such that the material does not protrude past respective actual projections of the outer peripheries of the respective spline members. This is necessary in order that there be no interference with the edge members proximate the apertures on bores 22 of the respective edge member, S, so that the beveled edges E1-E3 can abut together in a manner seen in FIG. 1 at corner F.

In order to effect the proper weld at 23 in FIG. 3, i.e. at the open corner formed by the proximate squared ends of the spline members, and without the use of filing or grinding, it is essential that certain welding techniques be followed.

Where the individual spline elements or members 25 are fabricated from cold rolled steel tubing, for example, it is suggested that a right-angle aluminum jig be used to position the spline member 25, with the jig being preheated to approximately 160° Fahrenheit.

An ideal welding process for joining the straight edges of the several spline edges is the process known as MIG welding, i.e., metallic inert gas welding, using either $CO_2$ or argon, for example; other forms of electrical welding can also be used.

Part of this invention is the concept that, by use of a jig, not shown, the three-legged spline structure may be set up to have right-angle axial alignment so that the process can be satisfactorily completed. It is noted that the ends G1, G2, and G3 of the respective spline members are sheared off in a normal, transverse direction, that is, at 90° relative to the respective axis of the spline members. This promotes a high-speed production process. Formerly it was felt that in order to join three members together as in FIG. 3 the proximate edges would have to be beveled so that these fit together much in the same manner as the elongate members 13, 15, and 18, for example. In such event, the manufacturing process is very time-consuming, and a separate technique such as silver soldering would have to be employed. Also, there is a matter of fitting which can be somewhat of a problem.

In the present invention, in contrast, a high-speed process is effected by simply using as spline elements, either solid or tubular lengths of perhaps 3 to 6 inches in length and having simply sheared-off squared ends as at G1–G3, and the joining together of these ends by welding in the manner above described. It is essential that the welding be performed such that the outer periphery 23' of weld material 23 does not extend beyond the intersection axial projections of the outer surface of spline members 25, this such that the spline structure may easily fit into the combined bore or aperture configuration of the three elongate edge members 13, 15, and 18 when the two are joined together.

In addition to adding rigidity to the structure, the spline structure S is also useful for assembling and making fast respective corners. This is accomplished by means of screws 24' as well as apertures 24 in each of the extruded edge members and positioned, respectively, in the manner shown in FIG. 2: the screws 24' may be self-tapping. In any event, when the spline members are in place these screws will screw tap themselves through the wall of the tubular spline members.

In sum, the present invention reinforces the corners of structures such as display cases, and this in a manner such that no mitering is required for the spline or reinforcing means used. Rather, the right-angle ends of the splines are joined by welding in a manner such that the composite spline structure S in FIG. 2 may fit into the right-angle joined bores or apertures as at representative aperture 22, such that the mitered ends of the elongate edge members 13 are brought together in flush contact.

As to the edges E1–E3, these in a right-angle structure may be mitered along the customary planes, as in the woodwork art, for joining three pieces or strips of wood or other material in mutually 90°, three-axis corner relationship.

While particular embodiments of the present invention have been shown and described, it will be obvious to those skilled in the art that changes and modifications may be made without departing from this invention at its broader aspects and, therefore, the aim in the appended claims is to cover all such modifications as fall within the true spirit and scope of the present invention.

I claim:

1. A three-legged totally concealed spline structure comprising first, second, and third members longitudinally arranged on three separate respective axes and having squared ends, respective ones of said squared ends being mutually proximately placed to mutually form an open corner, said respective ends being welded together at said open corner, by weld means being included solely within said open corner, such that said elongate members are held in a predetermined, three-dimensional angle configuration.

2. Structure according to claim 1 wherein the weld region is confined to that open corner as formed by said elongate members.

3. A method of fabricating a three-legged reinforcing spline structure comprising the steps of: providing first, second, and third elongate members; positioning said elongate members to form a three-dimensional angle configuration that defines an open, weld-receiving corner; and then welding said elongate members together at said corner in a manner such that the weld region formed thereby does not extend past the axial surface extensions of said elongate members.

4. A three-dimensional closed corner structure comprising first, second, and third elongate edge members, said edge members having mitered ends mutually abuttingly engaging each other and thereby forming of themselves a closed three-dimensional corner, each of said elongate members including indentations, adapted to receive translucent panels, and also a longitudinally oriented, spline-receiving cylindrical aperture; a three-legged reinforcing spline structure comprising first, second, and third cylindrical rod-like spline members, mutually forming an open corner and welded solely within said open corner, respectively disposed in said apertures and dimensioned to enable mutual abutment of said mitered ends of said edge members to self-form a closed corner; and screw means interior of said closed corner threaded into said edge members for fixedly securing said spline members thereto, whereby to retain the corner formed by said edge members and said spline members intact.

5. A plural-legged concealed spline and comprising plural elongate legs of differing axial orientations and having squared ends disposed proximately together to form an open corner, and weld material deposited solely within said open corner and constrained within surface extrapolations of said elongate legs, whereby to be constructed for hidden deposition in the interior regular grooves of external mutually fitted together, spline-leg containing elongate members.

* * * * *